Oct. 20, 1931.  G. N. KIRSEBOM  1,827,754
REDUCTION OF METALLIC COMPOUNDS AND PRODUCTION OF ARSENATES
Filed July 18, 1928
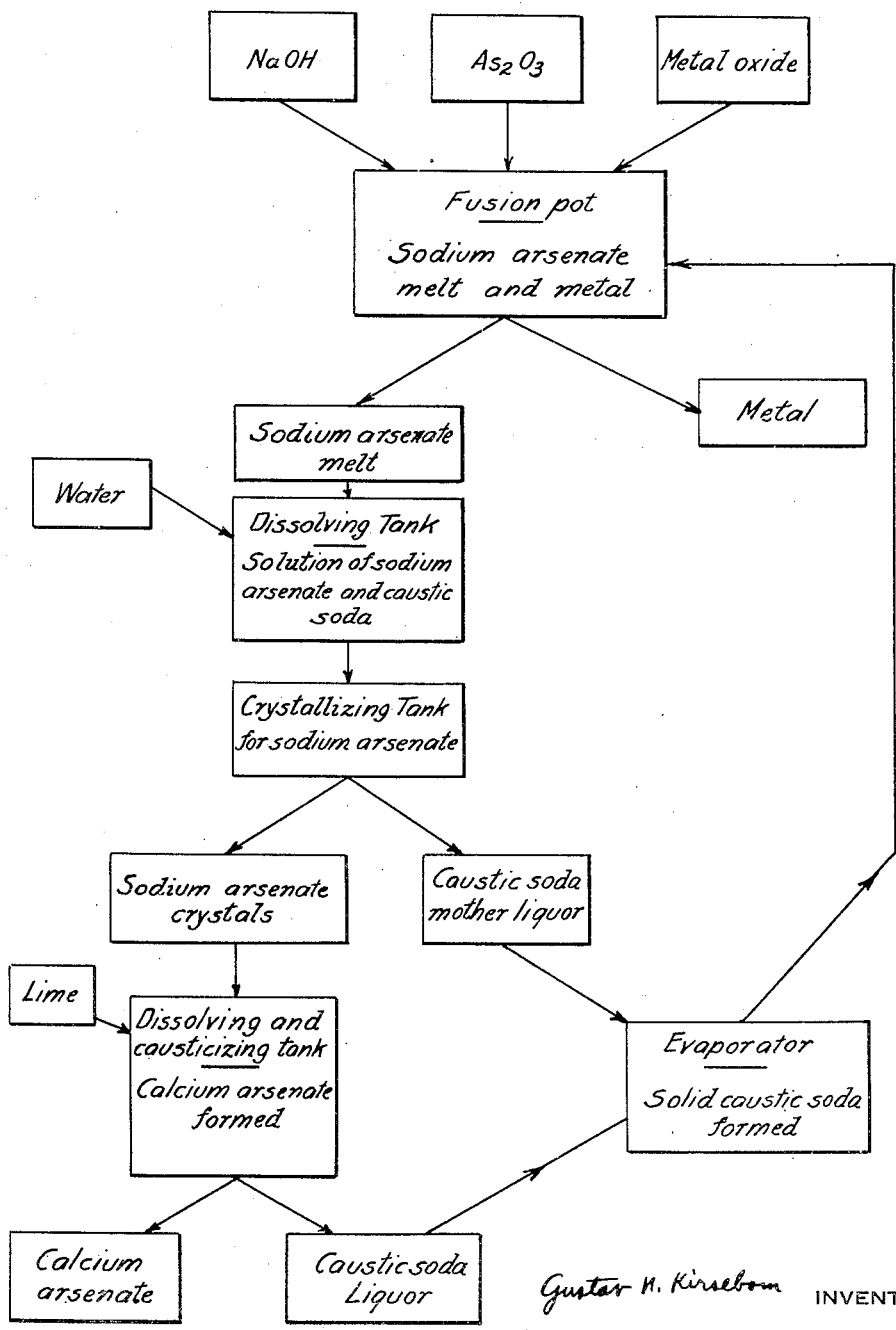

Patented Oct. 20, 1931

1,827,754

UNITED STATES PATENT OFFICE

GUSTAF NEWTON KIRSEBOM, OF BROOKLYN, NEW YORK

REDUCTION OF METALLIC COMPOUNDS AND PRODUCTION OF ARSENATES

Application filed July 18, 1928. Serial No. 293,709.

This invention relates to improvements in the reduction of metallic compounds, and particularly of metallic oxides, and to improvements in the production of arsenates.

The process of the present invention is a fused bath process in which metallic compounds present in or added to a fused caustic soda bath are reduced by the action of arsenic trioxide with the production of sodium arsenate and of the reduced metal.

I have found that when a mixture of arsenic trioxide and caustic soda are melted down together, or when arsenic trioxide is added to molten caustic soda, the resulting bath has strong reducing properties such that metallic oxides present in or added to the bath can be reduced to the metallic state.

When arsenic trioxide and caustic soda are melted down together, in the absence of a reducible compound, a mixture of sodium arsenate and sodium arsenite is formed with evolution of hydrogen. When, however, a reducible metal oxide is added to or present in the fused caustic soda bath the arsenic trioxide can be completely oxidized to sodium arsenate at the same time that the oxide of the metal is reduced to the metallic state. As a result sodium arsenate can be produced free or substantially so from sodium arsenite, the formation of arsenite being prevented, or any arsenite formed being oxidized to arsenate. At the same time the strongly reducing action resulting from the reaction of the arsenic trioxide and caustic soda is utilized for reducing the metallic oxide to the metallic state. The arsenic is thus recovered in the form of the oxidized salt, i. e., sodium arsenate, in which it can be employed, as hereinafter described, for the production of other arsenates, and particularly of calcium arsenate, with regeneration of the caustic soda for further use in the process. The present process accordingly provides an improved process for the commercial manufacture of arsenates.

I have found that various metallic oxides can be reduced to the metallic state by the present process. Successful results have been obtained with the oxides of lead, cadmium, bismuth, silver, gold and antimony. With all of these oxides, when mixed with arsenic trioxide and/or other suitable arsenic compound in the proper proportions and melted down with enough excess of caustic alkali metal compounds, such as caustic soda to form a fusible slag, the metal in each case would collect at the bottom and was thus easily separated from the slag. Gold and silver are commonly found in small amounts along with lead or other base oxides, and, when such base oxides are reduced by the present process, the gold and silver collect with the lead at the bottom of the receptacle. The reactions which apparently take place in the present process are as follows:

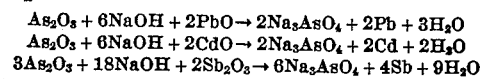

etc.

The process can be carried out in ordinary cast iron melting pots in which is charged an intimate mixture of arsenic trioxide and the metallic oxide to be reduced together with caustic soda in granulated or flaked form, and with subsequent heating of the mixture. The process may also be carried out by melting solid caustic soda to form a molten bath and introducing into the molten bath an intimate mixture of the arsenic trioxide with the metal oxide. Caustic soda baths or slags containing metallic oxides can be subjected to the present process by adding arsenic trioxide thereto.

The temperature at which the process is carried out to effect the reduction of the metallic compounds can be varied. It should be above the melting point of the caustic soda and in general I have used a temperature above that of the melting point of the oxide to be reduced. Temperatures up to around 400° C. or higher have been employed. When an intimate mixture is first made and then heated to form the fused bath the melting is accompanied with a large ebullition due to the escape of water during the reaction but without loss of oxides by dusting. The reaction takes place rapidly when the proper temperature is reached.

After the reduction has taken place, the reduced metal can be drawn off in molten form from the bottom of the melting pot through a suitable discharge opening. The fused bath or slag remaining will contain the sodium arsenate and can be granulated with water or run into molds and cooled and then dissolved in water in an iron tank. The metal can be cast into suitable form or can be mixed with other molten metals, etc.

The slag containing the sodium arsenate will also contain an excess of caustic soda. On dissolving this slag in water, e. g. to form a solution containing about 20% NaOH, any residue of unchanged oxide is allowed to settle to the bottom. When the solution is clear it is decantered into another tank and then cooled, with resulting deposit of sodium arsenate crystals which can be filtered off and recovered as a product of the process. The sediment left in the first tank is made into a sludge with water, filtered through a filter press, and the recovered sediment can then be dried and returned to the melting pot in the further carrying out of the process. The wash solution separating on filtering can then be used for dissolving a new batch of slag.

The sodium arsenate obtained in crystalline form can readily be converted into the form of other commercial arsenates such as lead arsenate or calcium arsenate. Calcium arsenate can readily be prepared for example by dissolving the crystals of sodium arsenate in water and adding milk of lime until the calcium arsenate is formed and settled. This formation of calcium arsenate causticizes the solution forming a solution of caustic soda, containing about 10% NaOH, which is combined with the mother liquor from which the sodium arsenate was separated and the solution evaporated to form solid caustic soda which is thus made available for use in the further carrying out of the process. The precipitated calcium arsenate is formed into a sludge and filtered and then dried and is available as a commercial product of the process. The water separated from the calcium arsenate on filtering is returned to the first tank for use in dissolving additional slag.

The production of sodium arsenate and calcium arsenate by the present process has important advantages over the production of arsenates according to present methods from arsenic trioxide. According to present methods the arsenic trioxide purchased from a smelter is oxidized in nitric acid to form arsenic acid which is then treated with a caustic soda solution to form sodium arsenate. The present process avoids the expense of oxidation with nitric acid and accomplishes the oxidation simultaneously with the reduction of other oxides to the metallic state.

The arsenic trioxide employed in the present process need not be used in a pure state but can be used in the form of the more or less impure arsenic trioxide recovered from roasting furnaces, smelters, etc. The flue dust recovered at smelters and roasting furnaces usually carries an intimate mixture of arsenic trioxide with the oxides of other metals. Lead smelters, for example, produce at the present time two kinds of dust. The roaster flue dust coming from the roasting furnaces contains mainly arsenic trioxide and lead oxide. The blast furnace flue dust coming from the blast furnaces consists mainly of lead oxide, arsenic trioxide and cadmium oxide. These flue dusts are commonly recovered in Cottrell plants and baghouses. The dust from other smelting or roasting operations may be high in antimony oxide or cadmium oxide, etc.

These flue-dusts containing arsenic trioxide can advantageously be treated by the process of the present invention. In case the flue dust treated is deficient in arsenic trioxide, a sufficient amount of arsenic trioxide can be added from another source. When such flue dusts are treated according to the present process, the arsenic trioxide is converted into sodium arsenate and the reducible metal oxides are reduced to the metallic state.

In the case of roaster flue dust containing mainly arsenic trioxide and lead oxide, the flue dust may be directly treated with caustic soda, care being taken that an excess of arsenic trioxide is present in the dust or added before treatment. The treatment with the fused caustic soda results in recovering the lead directly as metal and converting the arsenic trioxide into a sodium arsenate slag which can then be treated for the production of calcium arsenate, for example, as hereinbefore described.

In the case of cadmium-bearing dust, the relation between arsenic trioxide, lead oxide and cadmium oxide is regulated so as to have an excess of arsenic trioxide present for the reaction before the melting takes place. The result is a cadmium-lead alloy and a sodium arsenate slag.

Where the cadmium-lead alloy is thus produced it may either be refined directly or mixed with enough cadmium from another source to make an alloy containing not less than about 90% of cadmium, which can be cast into anodes and electrolyzed in a sulfate bath. Such anodes are readily disintegrated, giving pure cadmium on the cathode. The anode scrap and mud can be treated with sulfuric acid to remove the rest of the cadmium and the resulting lead sludge can be filtered off before the solution goes back to the tanks. The lead sludge, when dried and treated by the present process with fused caustic soda, gives a lead bullion which can be further refined if necessary in a lead refinery.

In the metallurgy of antimony the first roast will usually produce a flue dust carrying a high grade antimony oxide. A similar product is ofen produced as a by-product of the lead plants. Such products may be mixed with arsenic trioxide and caustic soda and subjected to the present process and the antimony recovered as a regulus. The sodium arsenate slag can then be treated for the recovery of calcium arsenate as above described and with regeneration of the caustic soda.

In treating flue dust the process of the present invention has marked advantages over processes now being used. For example, the roaster flue dust from lead smelters is now commonly agglomerated and charged into blast furnaces. The dust from lead blast furnaces is commonly treated in sintering machines where most of the arsenic is roasted off in the form of crude arsenic trioxide which is redistilled to produce marketable white arsenic. The sinter from this operation is recharged to the blast furnaces until in the cycle the cadmium content has increased sufficiently to render the extraction of cadmium from it possible. It is then crushed, treated with concentrated sulfuric acid, roasted, leached with water, the remaining arsenic removed by addition of copper sulfate and the pure cadmium sulfate solution then electrolyzed. The present process provides a simpler and more advantageous method of recovering the values from such flue dust.

The present process can also be carried out to advantage in conjunction with processes of refining metals in which caustic soda is employed. Caustic soda is employed for the refining of various metals such as lead, bismuth, antimony, etc. by adding caustic soda to the fused metal. The caustic soda extracts various impurities from the metals and there is obtained a slag or melt containing various metallic compounds. These melts can advantageously be employed in the present process, making use of the excess caustic soda which they contain and with reduction of metallic compounds therein to the metallic state. Such melts or slags can be employed in a fused state by adding arsenic trioxide thereto in proper amount with resulting formation of sodium arsenate and reduction of reducible metallic compounds to the metallic state, thereby recovering these metallic compounds from the melts or slags.

In using such caustic soda melts or slags, the arsenic trioxide may be supplied in the form of flue dust admixed with other oxides, and these other oxides may be reduced at the same time that the oxides, etc. contained in the slag are reduced. In this case, the resulting metal will be in part obtained from the metallic compounds contained in the melt or slag and in part from the metal oxides added with the arsenic trioxide in the flue dust.

For example, in the caustic soda refining of lead by the Harris process, where the molten lead is brought into intimate contact with caustic soda in excess of that which combines with the impurities, the resulting slag or melt will contain a large excess of caustic soda together with some sodium nitrate used in the process for the extraction of antimony and tin from the lead. The slag will contain small amounts of lead, antimony, tin and arsenic, which have been refined from the metal, these metals being in the form of oxides or in other oxidized form. By treating this melt while it is still in a molten condition with arsenic trioxide the lead and antimony are at once reduced and removed as metal which gathers at the bottom of the melting pot. The resulting slag containing sodium arsenate and sodium stannate can then be dissolved in water and the solution electrolyzed to remove the sodium stannate, leaving the sodium arsenate in solution. This sodium arsenate can then be recovered from the caustic in the manner above described, and the caustic solution evaporated and used over again.

Similarly where caustic soda is used in the refining of bismuth or antimony, etc. the resulting caustic melt or slag can be treated with arsenic trioxide to reduce the reducible metallic compounds to a metallic state and to form sodium arsenate. Electrolytic muds and metallic drosses in which a number of metals are present in partly oxidized form can similarly be treated by the present process with fused caustic soda and arsenic trioxide to separate the contained metals from each other.

In these refining processes in which caustic soda melts or slags are employed containing reducible metallic compounds, the arsenic trioxide may, as above pointed out, be used in the form of flue dust admixed with other oxides, which are also reduced during the process, thus giving reduced metals derived in part from the alkali melt or slag and in part from the added flue dust, and utilizing the excess caustic soda from the refining process in the process of the present invention. The caustic soda which is recovered from the aqueous solution by concentration, after the separation of the sodium arsenate, can be returned for use in the present process. It can also be returned to the refining process and used first for the refining of molten lead according to the Harris process, or for the refining of other molten metals, and the slag or melt resulting from such refining process can then be employed with its excess fused caustic soda by adding arsenic trioxide thereto according to the present process. In this cyclic process the caustic soda serves in two successive processes, first, the refining process in which an excess of the caustic is required, and second, in the fusion process with arsenic trioxide in which part of this excess caustic is employed for producing sodium arsenate and in which metallic oxides are reduced to the metallic state.

A flow sheet illustrative of the present process is shown in the accompanying drawing. This flow sheet shows the process in which arsenic trioxide and the metal oxide are treated with fused caustic soda to form a sodium arsenate slag or melt and reduced metal. The metal is separated and recovered as a product of the process. The sodium arsenate melt is dissolved, the solution settled, the sodium arsenate crystallized, the crystals dissolved and causticized with lime to form calcium arsenate and caustic soda liquor and the caustic soda liquor evaporated to recover caustic soda for further use in the process.

It will be understood that this flow sheet is illustrative of the invention but that the invention is not limited thereto and is capable of various applications in combination with other processes. It will be noted, however, from the flow sheet that the caustic soda employed can be regenerated for use where calcium arsenate is produced and that the only caustic soda which it is necessary to add in such case is that which will make up for losses in the process. In this process the raw materials employed are the arsenic trioxide which may be employed in the form of flue dust and the metal oxide which may also be employed in the form of flue dust or in the form of the impurities extracted by the caustic soda in the refining processes.

The invention will be further illustrated by the following specific examples, but it will be understood that the invention is not limited thereto. The parts are by weight.

*Example 1.*—100 parts of a dust having the following composition:

|   | Per cent |
|---|---|
| $As_2O_3$ | 30 |
| PbO | 40 |
| $PbSO_4$ | 5 |
| ZnO | 5 |
| $Fe_2O_3$ | 4 |
| $CaSO_4$ | 7 |
| CaO | 5 |
| $Sb_2O_3$ | 2 |
| $SiO_2$ | 2 | was mixed with 100 parts of caustic soda and the mixture heated in a fusion pot to a temperature of about 400° C. The arsenic contained in the dust was present in some excess of that required for the reduction. From 100 parts of the dust there was obtained 45 parts of metal analyzing 3.5% antimony and 150 parts of a sodium arsenate slag. From this slag on treatment in the manner above described there was obtained 50 parts of calcium arsenate and 15 parts of sediment.

*Example 2.*—100 parts of an antimonial oxide dust running approximately 80% $Sb_2O_3$, 12% $As_2O_3$ and 5% PbO was mixed with 100 parts of arsenic trioxide and 150 parts of caustic soda and the mixture was heated to a temperature of about 650° C., that is above the melting point of the antimony oxide. As a result of the reaction there was obtained 70 parts of a regulus running 5.5% lead and 250 parts of a sodium arsenate slag from which there was obtained 200 parts of calcium arsenate and only 0.8 parts of sediment. In this example the arsenic trioxide present in the dust was not sufficient and additional arsenic trioxide was added.

*Example 3.*—100 parts of a dust containing 40% CdO, 40% $As_2O_3$ and 20% PbO was mixed with 100 parts of caustic soda and smelted at about 400° C. There was obtained about 50 parts of a cadmium lead alloy analyzing 36.5% lead and 140 parts of a sodium arsenate slag from which 68 parts of calcium arsenate were produced and 3 parts of sediment.

In these examples the regeneration and reuse of the caustic soda is not included, but it will be understood that in the carrying out of the process, where the sodium arsenate is not to be itself sold, it can be converted into calcium arsenate by treatment with lime and the calcium arsenate sold as a commercial product and the caustic soda recovered by evaporation.

It will thus be seen that the present invention provides an improved process for producing arsenate from arsenic trioxide and particularly from impure arsenic trioxide having other metal oxides admixed therewith. It will further be seen that the present invention provides an improved process for reducing metal oxides to metals and particularly for reducing metal oxides such as are contained admixed with arsenic trioxide in flue dust, etc. and such as are extracted from lead and other molten metals when caustic soda is employed for refining them. It will further be seen that the process can advantageously be carried out in conjunction with caustic soda refining processes in which slags or metals are obtained containing an excess of caustic soda, which caustic soda is then employed for reaction with arsenic trioxide in the production of arsenate and the reduction of metal compounds, and particularly of the metal compounds contained in the caustic soda slag employed and added in admixture with the arsenic trioxide.

I claim:

1. The method of producing metallic lead or lead alloys from flue dust containing lead oxide and arsenic trioxide which comprises causing such flue dust to react with fused caustic soda to reduce lead oxide to metallic lead and to convert arsenic trioxide into sodium arsenate, and separating the reduced lead or lead alloy from the sodium arsenate melt.

2. The method of producing cadmium lead alloys which comprises causing cadmium-bearing dust containing arsenic trioxide, lead oxide and cadmium oxide to react with fused caustic soda, a sufficient amount of arsenic trioxide being present or added so that the cadmium oxide and lead oxide will be reduced to form a cadmium lead alloy, and separating such alloy from the caustic melt containing sodium arsenates.

3. The method of treating material containing lead oxide which comprises causing the lead oxide to react with a fused caustic alkali metal compound in the presence of arsenic trioxide whereby the lead oxide is reduced to metallic lead, and separating the resulting metallic lead from the alkali metal slag.

4. The method of treating material containing the oxides of lead and cadmium which comprises causing the oxides of lead and cadmium to react with a fused caustic alkali metal compound in the presence of arsenic trioxide whereby the lead oxide and cadmium oxide are reduced to metallic lead and cadmium, and separating the resulting lead-cadmium alloy from the alkali metal slag.

5. The method of treating material containing the oxides of lead, cadmium, and antimony, which comprises causing the oxides of lead, cadmium and antimony to react with a fused caustic alkali metal compound in the presence of arsenic trioxide whereby the oxides of lead, cadmium and antimony are reduced to metallic lead, cadmium and antimony, and separating the resulting metallic lead-cadmium-antimony alloy from the alkali metal slag.

6. The method of treating material containing the oxides of lead and antimony which comprises causing the oxides of lead and antimony to react with a fused caustic alkali metal compound in the presence of arsenic trioxide whereby the lead oxide and antimony oxide are reduced to metallic lead and antimony, and separating the resulting metallic lead and antimony from the alkali metal slag.

7. The method of treating caustic soda slag containing the oxysalts of lead and antimony which comprises bringing the oxysalts of lead and antimony into reactive relation with arsenic trioxide and caustic soda in amount sufficient to effect the reduction of the lead and antimony compounds to metallic lead and antimony, and separating the resulting lead-antimony alloy from the caustic soda slag.

8. The method of treating caustic soda slag containing the oxysalts of lead which comprises causing the oxysalt of lead to react with a fused caustic alkali metal compound in the presence of arsenic trioxide whereby the oxysalt of lead is reduced to metallic lead, and separating the resulting metallic lead from the alkali metal slag.

In testimony whereof I affix my signature.

GUSTAF NEWTON KIRSEBOM.